(12) United States Patent
Kudo

(10) Patent No.: US 7,840,580 B2
(45) Date of Patent: Nov. 23, 2010

(54) PERIPHERAL DEVICE, SEARCH RESULT STORAGE METHOD AND COMPUTER PROGRAM PRODUCT

(75) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 904 days.

(21) Appl. No.: 11/646,419

(22) Filed: Dec. 28, 2006

(65) Prior Publication Data
US 2007/0185842 A1    Aug. 9, 2007

(30) Foreign Application Priority Data
Dec. 28, 2005    (JP)    ............... 2005-377786

(51) Int. Cl.
*G06F 17/30*    (2006.01)
(52) U.S. Cl. .................. 707/758; 707/728; 709/201
(58) Field of Classification Search .............. 707/1, 707/3, 706, 713, 723, 728, 741, 754, 758, 707/763, 769; 358/1.15, 1.19; 705/26; 709/201, 709/203, 218, 223, 239; 714/38
See application file for complete search history.

(56) References Cited

U.S. PATENT DOCUMENTS

| | | | | |
|---|---|---|---|---|
| 5,659,727 A | * | 8/1997 | Velissaropoulos et al. ... | 707/706 |
| 5,790,778 A | * | 8/1998 | Bush et al. ................. | 714/38 |
| 5,911,139 A | * | 6/1999 | Jain et al. .................. | 707/706 |
| 5,913,205 A | * | 6/1999 | Jain et al. .................. | 707/723 |
| 5,915,250 A | * | 6/1999 | Jain et al. .................. | 707/706 |
| 6,006,331 A | * | 12/1999 | Chu et al. .................. | 726/5 |
| 6,009,432 A | * | 12/1999 | Tarin ......................... | 707/706 |
| 6,081,814 A | * | 6/2000 | Mangat et al. ............. | 715/205 |
| 6,098,108 A | * | 8/2000 | Sridhar et al. .............. | 709/239 |
| 6,157,942 A | * | 12/2000 | Chu et al. .................. | 709/203 |
| 6,289,334 B1 | * | 9/2001 | Reiner et al. ............... | 707/713 |

(Continued)

FOREIGN PATENT DOCUMENTS

JP    2002-209049 A    7/2002

(Continued)

OTHER PUBLICATIONS

Japanese Notification of Reasons for Refusal, with English Translation, issued in Japanese Patent Application No. JP 2005-377786, dated Mar. 25, 2008.

*Primary Examiner*—Shahid A Alam
(74) *Attorney, Agent, or Firm*—Baker Botts L.L.P.

(57) ABSTRACT

A peripheral device that includes: a search condition transmitting unit that transmits a search condition by using a protocol, in which support for a method of designating to an external device the number of an information piece from which information pieces are returned when the plural information pieces exist as search results is not defined to be indispensable to all compatible devices; a receiving unit that receives information transmitted from the external device; a storage unit that stores a predetermined number of search result information pieces transmitted from the external device; a storage starting number determining unit that determines the number of a search result information piece from which storage of the search result information pieces is started; and a storage control unit that stores the search result information pieces received by the receiving unit into the storage unit from the number determined by the storage start number determining unit.

17 Claims, 12 Drawing Sheets

U.S. PATENT DOCUMENTS

| | | | |
|---|---|---|---|
| 6,606,638 B1 * | 8/2003 | Tarin | 707/713 |
| 6,609,121 B1 * | 8/2003 | Ambrosini et al. | 707/763 |
| 6,732,160 B2 * | 5/2004 | Ambrosini et al. | 709/218 |
| 6,862,622 B2 * | 3/2005 | Jorgensen | 709/226 |
| 6,965,958 B1 * | 11/2005 | Sugiyama | 710/104 |
| 6,996,611 B1 * | 2/2006 | Muto | 709/223 |
| 7,016,897 B2 * | 3/2006 | Hill et al. | 707/713 |
| 7,065,500 B2 * | 6/2006 | Singh et al. | 705/26 |
| 7,081,965 B2 * | 7/2006 | Taniguchi | 358/1.15 |
| 7,184,995 B2 * | 2/2007 | Kaw et al. | 707/769 |
| 7,191,170 B2 * | 3/2007 | Ganguly et al. | 707/741 |
| 7,315,854 B2 * | 1/2008 | Kumar | 707/754 |
| 7,315,860 B1 * | 1/2008 | Harvey | 707/769 |
| 7,487,176 B2 * | 2/2009 | MacLeod et al. | 707/803 |
| 2004/0143566 A1 * | 7/2004 | Fukasawa | 707/1 |
| 2006/0023235 A1 * | 2/2006 | Fukuda et al. | 358/1.9 |

FOREIGN PATENT DOCUMENTS

| | | |
|---|---|---|
| JP | 2004-274486 A | 9/2004 |
| JP | 2005-094358 | 4/2005 |

\* cited by examiner

FIG. 5A  INPUT SEARCH KEY
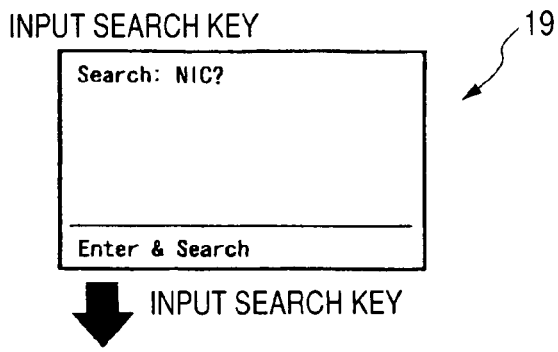
↓ INPUT SEARCH KEY
FIG. 5B  DISPLAY LIST OF SEARCH RESULTS
(DISPLAY TILL THREE CASES AT A TIME)
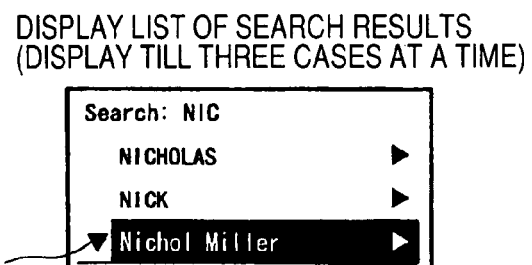
↓ PUSH ▼ KEY TO SCROLL LINE BY LINE
FIG. 5C  DISPLAY OF LIST OF SEARCH RESULTS (NEXT PAGE)
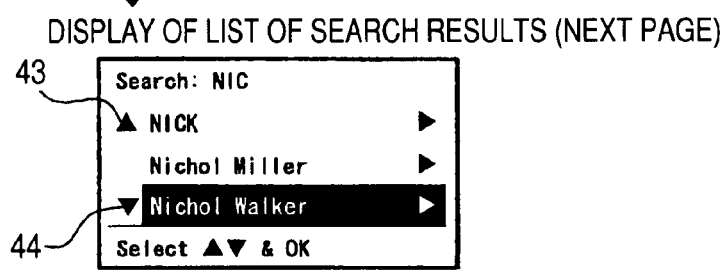
↓ FURTHER PUSH ▼ KEY
FIG. 5D  DISPLAY LIST OF SEARCH RESULTS (NEXT PAGE)
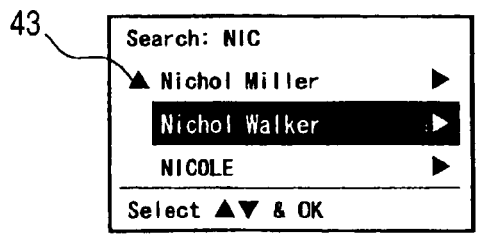
↓ PUSH ▼ KEY
FIG. 5E  DISPLAY DETAILED INFORMATION
OF SEARCH RESULT
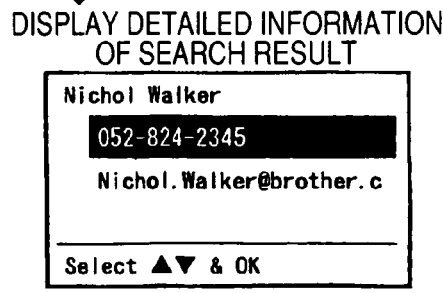

| | |
|---|---|
| 0TH CASE:<br>dn: cn=NICHOLAS, dc=company, dc=co, dc=jp<br>cn: NICHOLAS<br>facsimileTeleph oneNumber: 052 -xxx-2345<br>mail: nicholas@brother.co.jp<br>sn: Stallman<br>title: Manager<br>ou: Sales div.<br>description: Administrator | ← IDENTIFICATION NAME<br>← GENERAL APPELLATION<br>← FAX NUMBER<br>← EMAIL ADDRESS<br>← SURNAME<br>← TITLE<br>← DEPARTMENT<br>← DESCRIPTION |

FIRST CASE:
dn: cn=NICK, dc=company, dc=co, dc=jp
cn: NICK
facsimileTelephoneNumber: 06 -xxxx-0123
mail: nick@brother.co.jp
sn: Hudson
title: Software Engineer
ou: Osaka branch
description:

SECOND CASE:
dn: cn=Nichol Miller, dc=company, dc=co, dc=jp
cn: Nichol Miller
facsimileTelephoneNumber: 082 -xxx-1234
mail: Nichol.Miller@brother.co.jp
sn: Miller
title: Manager
ou: Hiroshima branch
description:

THIRD CASE:
dn: cn=Nichol Walker, dc=company, dc=co, dc=jp
cn: Nichol Walker
facsimileTelephoneNumber: 052 -824-2345
mail: Nichol.Walker@brother.co.jp
sn: Walker
title:
ou: R&D div.
description:

PERIPHERAL DEVICE, SEARCH RESULT STORAGE METHOD AND COMPUTER PROGRAM PRODUCT

CROSS-REFERENCE TO RELATED APPLICATION

This application claims priority from Japanese Patent Application No. 2005-377786, filed Dec. 28, 2005, the entire subject matter of which is hereby incorporated by reference.

TECHNICAL FIELD

Aspects of the present invention relate to a peripheral device, a search result storage method and a computer program product.

BACKGROUND

There has been hitherto known a data transmission device (MFP) for acquiring personal information from a directory server and carrying out FAX transmission or mail transmission by using transmission destination information (FAX number, mail address or the like) contained in the personal information (see JP-A-2004-274486, for example).

When a user of the data transmission device utilizes transmission destination information, the user inputs a predetermined search condition to the data transmission device to make the directory server carry out a search. The user acquires a search result from the directory server, extracts transmission destination information from the search result and utilizes it for data transmission.

SUMMARY

A protocol called as LDAP (Lightweight Directory Access Protocol) is used for the communication between a directory server and a data transmission device. LDAP is a protocol for settling standard communications of the directory service on a network, and the present main stream is LDAPv3 (version 3). According to this LDAPv3, it is not defined that every compatible device has to support a method of designating which number information piece should be first returned (a method of designating a partial acquisition) when there are plural search result information pieces, for example, such a case that only a fifth result out of ten search results is to be acquired. Furthermore, it is not defined that every compatible device has to support a method of first returning the information pieces from the search result information piece whose number is designated when there are plural search result information pieces by the method of designating the partial acquisition.

In the case of using a protocol such as LDAP, which does not define that the support of the method of designating the partial acquisition of the search result is indispensable to all the compatible devices, it is necessary to acquire all the search results at a time. However, a device having a small memory capacity cannot store all the search results. Accordingly, in a case where the device acquires first ten search results, even when necessary information is afterwards transmitted, the device cannot store the information into the memory, so that the necessary information cannot be used for data transmission or the like.

Aspects of the present invention provide a peripheral device that can process any number of search results transmitted from a directory server even when a memory installed therein has a small memory capacity.

BRIEF DESCRIPTION OF THE DRAWINGS

FIG. 5 is a display example of a display device;
FIG. 8 is an example of entry information.

DETAILED DESCRIPTION

Now, aspects of the present invention will be described with reference to the drawings.

A peripheral device is constructed as a multifunction device in which functions such as a FAX function, a mail transmission function, a print function, a scanner function, a copying function, etc., are installed. A data transmission system 1 containing a peripheral device 10, a directory server 30 (an example of an external device) and a wire communication network will be described. The peripheral device 10 may be a device having only the FAX function, a device having only the mail transmission function, or a device having a function (not shown in FIG. 2) in combination with the FAX function or the mail function.

Figure 1:
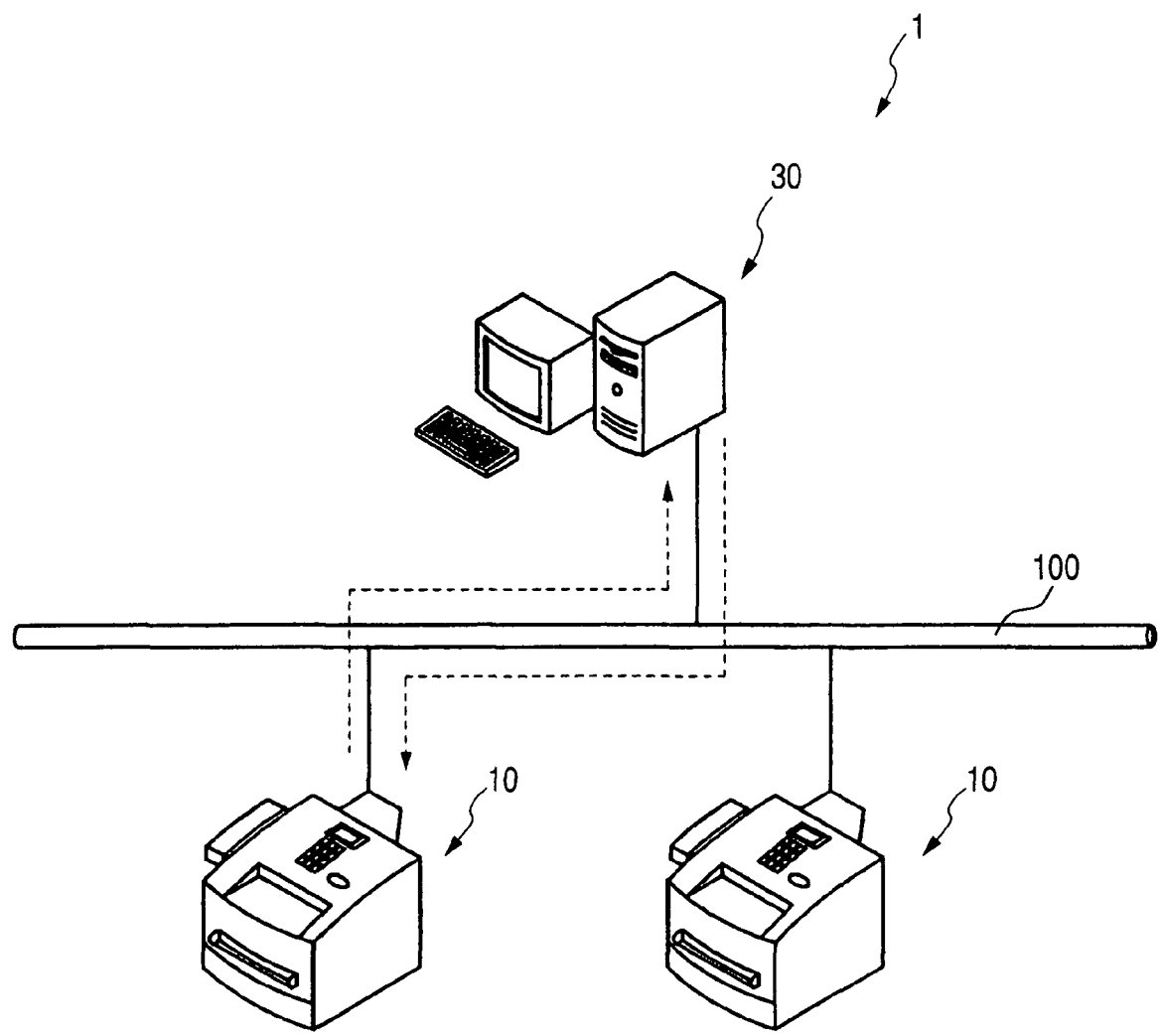
FIG. 1 is a schematic diagram showing a data transmission system containing a peripheral device and a directory server.

FIG. 1 is a schematic diagram showing an example of the data transmission system. In the data transmission system 1, the peripheral device 10 is connected to the directory server 30 such as an LDAP server through a wire communication network 100. A serial communication cable, a parallel communication cable, a wire LAN cable or the like is used for the wire communication network 100. Instead of the wire communication network 100, a wireless communication network may be used.

Figure 2:
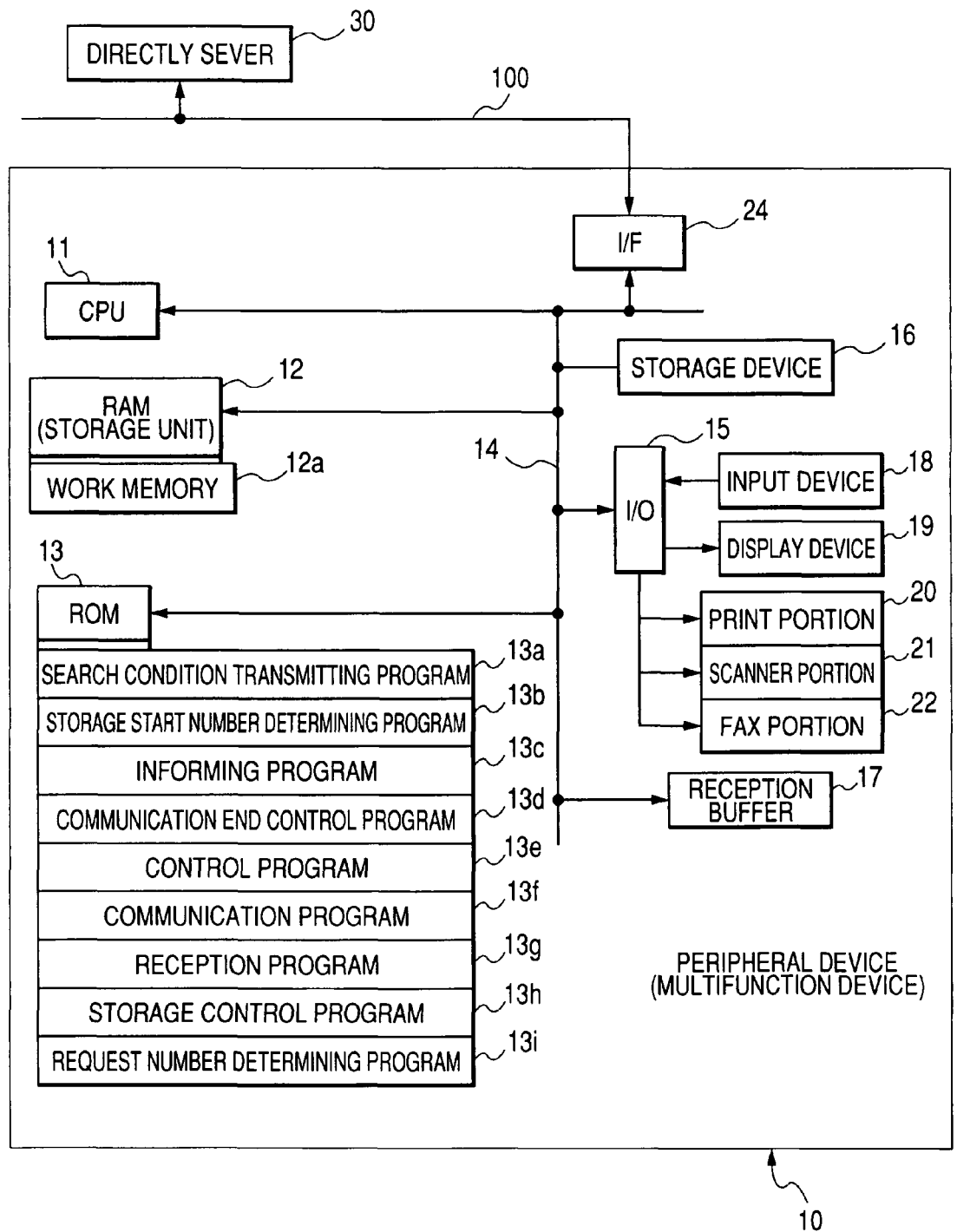
FIG. 2 is a block diagram showing an example of the peripheral device.

FIG. 2 shows an example of the block diagram of the peripheral device 10. The peripheral device 10 includes CPU 11; RAM 12 (storage unit) having a work memory 12a; ROM 13 for storing various kinds of programs; a bus line 14; an input/output portion (I/O); a storage device 16 constructed by a non-volatile memory such as EEPROM or the like or a hard disk; a communication interface (I/F) 24 that is connected to the communication network 100 to transmit/receive data to/from the directory server 30; and a reception buffer memory (hereinafter referred to as reception buffer) 17 for temporarily storing received print control data. To the input/output portion 15 are connected an input device 18 comprising a touch panel, push button switches is or numeric keypads; a display device 19 (display unit) such as LCD or the like; and a print portion 20 comprising a well-known ink jet print mechanism, a laser print mechanism, a thermal transfer print mechanism, a dot impact type print mechanism or the like. The communication interface 24 is a wire communication interface and is connected to the wire communication network 100. In ROM 13 are stored various kinds of programs such as a search condition transmission program 13a; a storage start number determining program 13b; an informing program 13a; a communication end control program 13d; a control program 13e; a communication program 13f; a reception program 13g; a storage control program 13h; a request number determining program 13i, etc. These programs are loaded to CPU 11 and executed therein, whereby these programs are interlocked with one another and function as one program. Furthermore, it is unnecessary that the respective programs are stored independently of one another. The peripheral device 10 may have a composite program having the contents of plural programs in combination or divisional programs into which the programs thus shown are divided. Furthermore, the peripheral device 10 may be equipped with sub CPU in addition to CPU 11, and the programs may be loaded to CPU 11 and sub CPU and interlocked with one another, thereby functioning as one program.

In the storage device 16 are stored search base information for carrying out network setting including the IP address of the peripheral device 10, a sub network mask, and a default gateway address. The search base information designates a base entry from the IP address, the host name or other entries of the LDAP server (directory server) 30 for conducting a search. Also, search scope information are stored in the storage device 16 for designating whether the base entry itself should be searched, an entry just below the base entry should be searched or all the entries below the base entry should be searched. Further, search filter information are stored in the storage device 16 for designating which attribute should be set as a search target for the search condition from attributes held by the entries. Furthermore, acquisition attribute information are stored in the storage device 16 for designating which attribute value should be requested to be returned as a search result from the attributes held by the entries. Of course, these values can be set or altered by a user through the input device of the peripheral device 10 or through a device which can communicate with the peripheral device 10. These information pieces are transmitted to the LDAP server 30 in a format compatible to LDAP and subjected to processing such as reception/search/replay processing in the LDAP server 30.

The search base information in this aspect is "dc=company, dc=co, dc=jp" and designates that an entry dc=company, which is below an entry dc=co below dc=jp within a directory tree having the entry dc=jp as the apex.

Furthermore, the search scope information is "SUBTREE" and designates that all the entries below the base entry are searched.

The search filter information is "(cn=*)" and is transmitted to the LDAP server 30 while adding a character array, which is input through keys by a user and located on the left of "*". For example, when "NIC" is key-input, the addition of the search filter information and "NIC" is "(cn=NIC*)", and it becomes information indicating that an entry having a character array starting from "NIC" as the value of the attribute as cn is searched.

Furthermore, the acquisition attribute information is "mail, facsimile TelephoneNumber, sn, title, ou, description". This requests a reply containing the value of mail as the attribute of the mail address of the entry, the value of facsimile TelephoneNumber as the attribute of FAX number, the value of sn as the attribute of surname, the value of title as the attribute of title, the value of ou as the attribute of department, and the value of description as the attribute of the description. It is needless to say that only return of the FAX number and the mail address is requested with "facsimile TelephoneNumber, mail" set as the search result attribute designating information.

Furthermore, in this aspect, the data transmission device is constructed as a so-called multifunction device, and a print portion 210, a scanner portion 21 used for copying and image reading, and a FAX portion 22 are connected to the input/output portion 15 as control targets. The operations of the print portion 20, the scanner portion 21 and the FAX portion 22 are well known, and the operations thereof are controlled by loading a control program 13e stored in ROM 13 into the work memory 12a of RAM 12 and executing the control program 13e by CPU 11.

The peripheral device 10 is equipped with a mail transmission/reception function for transmitting/receiving an electronic mail. The program for implementing the email transmission/reception function is well known, and the operation is controlled by loading the communication program 13f stored in ROM 13 into the work memory 12a of RAM 12 and executing the program by CPU 11.

The search condition transmission program 13a stored in ROM 13 is a program for transmitting the search condition to the directory server 30 on the basis of the user's operation as described above. The storage start number determining program 13b is a program for determining the number of a search result from which plural search results transmitted from the directory server 30 are stored. When all the search results transmitted from the directory server cannot be stored, the informing program 13c indicates the fact concerned. The communication end control program 13d is a program for instructing the directory server to finish the transmission at the time point when the storage unit 12 completes the storage. Furthermore, the control program 13e is a program for controlling the scanner portion 21 and the FAX portion 22 as described above, and the communication program 13f is a program for transmitting/receiving emails. Furthermore, the reception program 13g is a program for receiving the search results transmitted from the directory server 30. The storage control program 13h is a program for storing the received search result from the search result whose number is determined by the storage start number program 13b. The request number determining program 13i is a program for determining whether an input requests information of search results whose numbers are not stored in the storage unit. The search condition transmission program 13a, the storage start number determining program 13b, the informing program 13c, the communication end control program 13d, the reception program 13g, the storage control program 13h and the request number determining program 13i are loaded and executed by CPU, whereby examples of a search condition transmitting unit, a storage start number determining unit, an informing unit, a communication end control unit, a receiving unit, a storage control unit and a request number determining unit are implemented.

Figure 3:
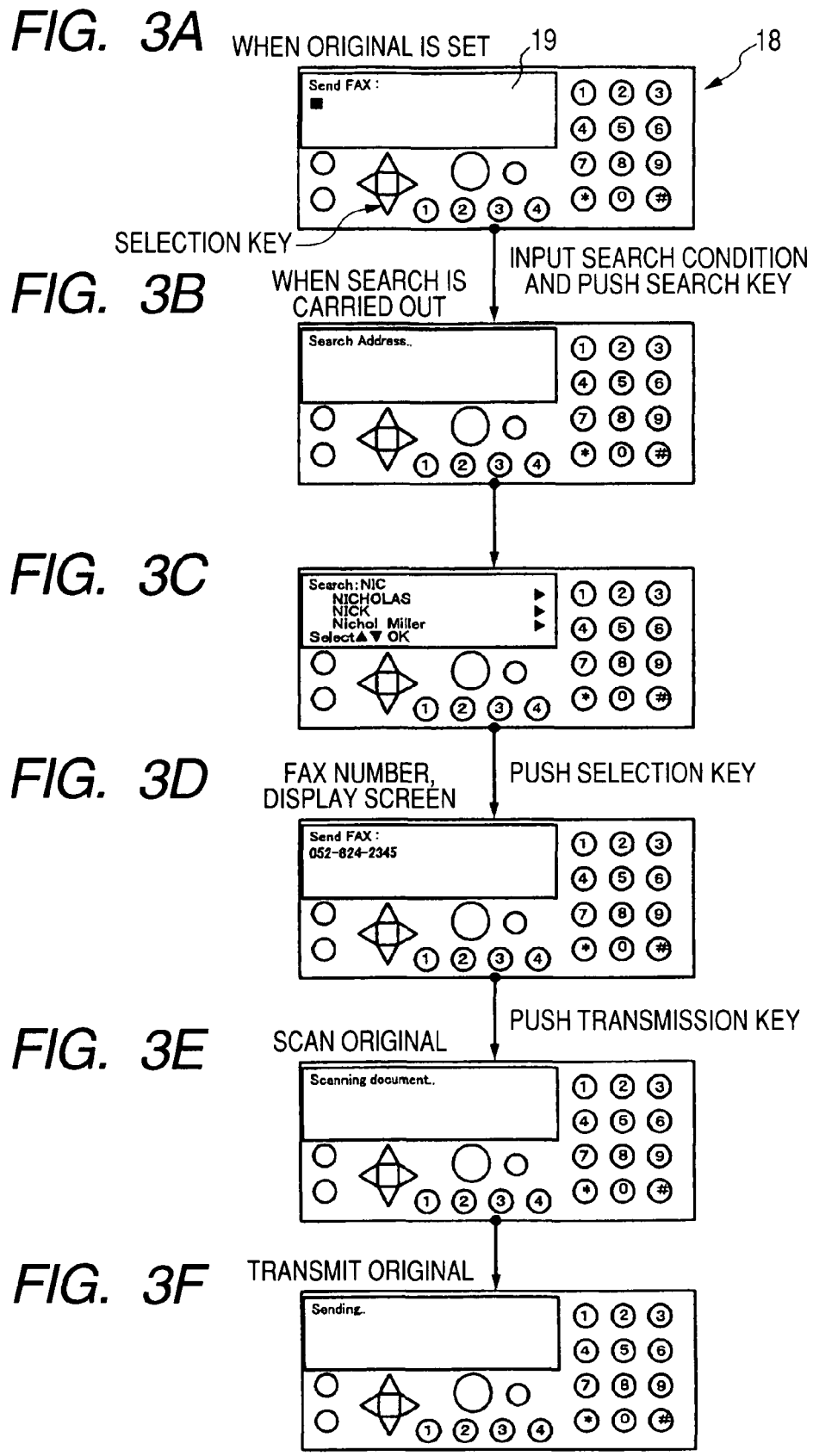
FIG. 3 is a diagram showing operations when data are transmitted.

Next, the input device 18 and the display device 19 of the peripheral device 10 will be described with reference to FIGS. 3A to 3F. In this aspect, the display device 19 is constructed so that three search results (names) can be displayed at maximum, and the storage unit 12 is constructed so that four search results can be stored at maximum. The input device 18 and the display device 19 are integrally formed in the peripheral device 10, and numeric keys, alphabetic keys (also serve as the numeric keys: not shown), symbol input keys (also serve as the numeric keys: not shown), selecting keys (right triangular key, left triangular key, upper triangular key and lower triangular key), a transmitting key, a search key, etc., are arranged. A user pushes any key, whereby a series of operations shown in FIGS. 3A to 3F are carried out. FIG. 3A shows a display state immediately after the peripheral device 10 enters a FAX mode. The peripheral device 10 enters the FAX mode when it is detected that an original is set in the scanner portion 21 or a key is input by the user to enter the FAX mode. FIG. 3B shows a display state when the peripheral device 10 instructs the directory server to search an address book and waits ready. When it is detected that the search key is input by the user under the display state shown in FIG. 3A, the peripheral device 10 carries out a search instruction by transmitting to the directory server 30 a search condition which is key-input in advance through the processing described later by the user. FIG. 3C shows a display state of a list of search results after the peripheral device 10 receives information of search results of the address book from the directory server 30. The peripheral device 10 receives the information of the search results from the directory server 30 through the processing described later, stores the information into RAM 12 and displays a list of the information on the display device 19. FIG. 3D shows a display state when the peripheral device 10 selects and determines some information as information of a FAX transmission destination from the displayed list of information. The peripheral device 10 selects and determines the information concerned as the information of the FAX transmission destination according to the user's key input such as the selection key or the like. FIG. 3E shows a display state when the peripheral device 10 reads the original on the scanner portion 21. The peripheral device 10 starts reading the original when it is detected that the user inputs the transmission key. FIG. 3F shows a display state when the peripheral device 10 FAX-transmits the FAX transmission data generated by reading the original to the transmission destination which was selected and determined previously. When the reading of the original and the generation of the FAX transmission data are finished, the peripheral device 10 FAX-transmits the FAX transmission data.

In this case, FAX transmission has been described as an example. However, this aspect may be applied to email transmission. When applied to the email transmission, the peripheral device 10 enters not the FAX mode, but an email mode when the original set or key-input is detected, and FIGS. 3A to 3F show display states from the search of the address book from the directory server 30 till the email transmission of information of search results as information of an email transmission destination. It is needless to say that this aspect is applicable to another transmission system.

Figure 4:
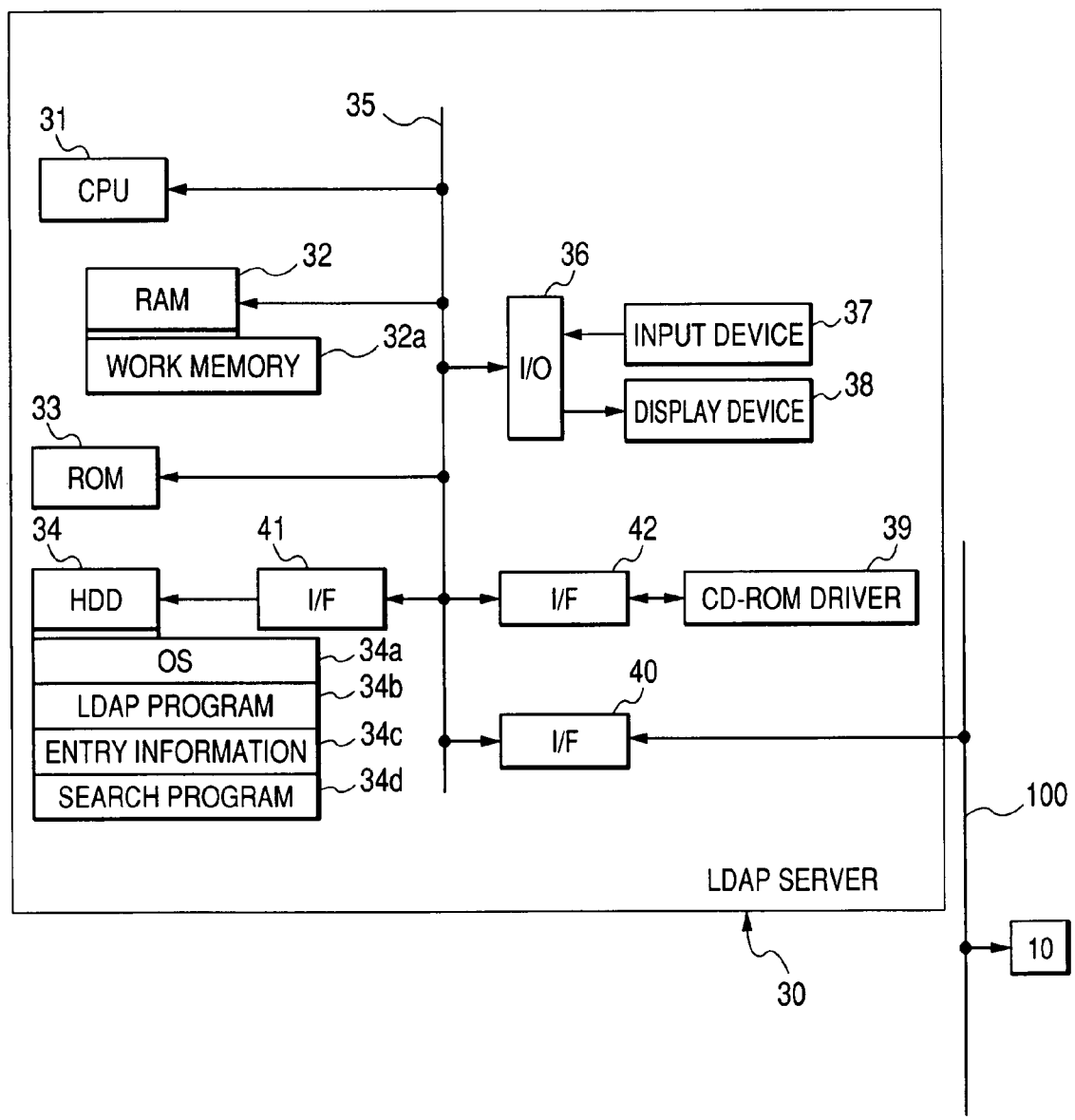
FIG. 4 is a block diagram showing the directory server.

Next, the directory server 30 will be described with reference to a block diagram of FIG. 4. The directory server 30 is constructed as a server computer equipped with CPU 31, RAM 32 having a work memory 32a, ROM 33 for storing various kinds of programs, a hard disk drive (HDD) 34 as a storage device, a bus line 35, an input/output portion (I/O), a transmission/reception communication interface 40 that is connected to a CD-ROM drive 39 and a wire communication network 100 to transmit/receive print control data, etc. A personal computer (or work station) may be used in place of the server computer if it has sufficient performance and reliability. HDD 34 and the CD-ROM drive 39 are connected to the bus line 35 through the interfaces 41 and 42. In HDD 34 are stored OS 34a serving as a basic software of the directory server 30, LDAP program 34b for implementing the function as the LDAP server, the entry information 34c, the search program 34d, etc. To the input/output portion 36 are connected an input device 37 comprising a keyboard, a mouse or the like, and a display device 38 comprising LCD or CRT.

FIG. 8 shows a specific example of the entry information 34c. The entry information 34c contains the name of a transmission destination and detailed information (FAX number, email address, company name, title name, department name, description information, etc.), and these information are associated with one another and constructed as one data. The user searches this entry information 34c from the peripheral device 10, and uses it for FAX transmission or mail transmission. That is, when the user inputs a search condition from the input device 18 of the peripheral device 10 and pushes the search key, the search condition transmitting program 13a (FIG. 2) is executed and the search instruction is made to the directory server 30. Thereafter, the directory server 30 executes the search with the search program 34d (FIG. 4), and returns the entry information 34c matched to the search condition as a search result to the peripheral device 10. The peripheral device 10 extracts the FAX number or the email address from the search result returned as a reply, and uses it for data transmission.

Figure 6:
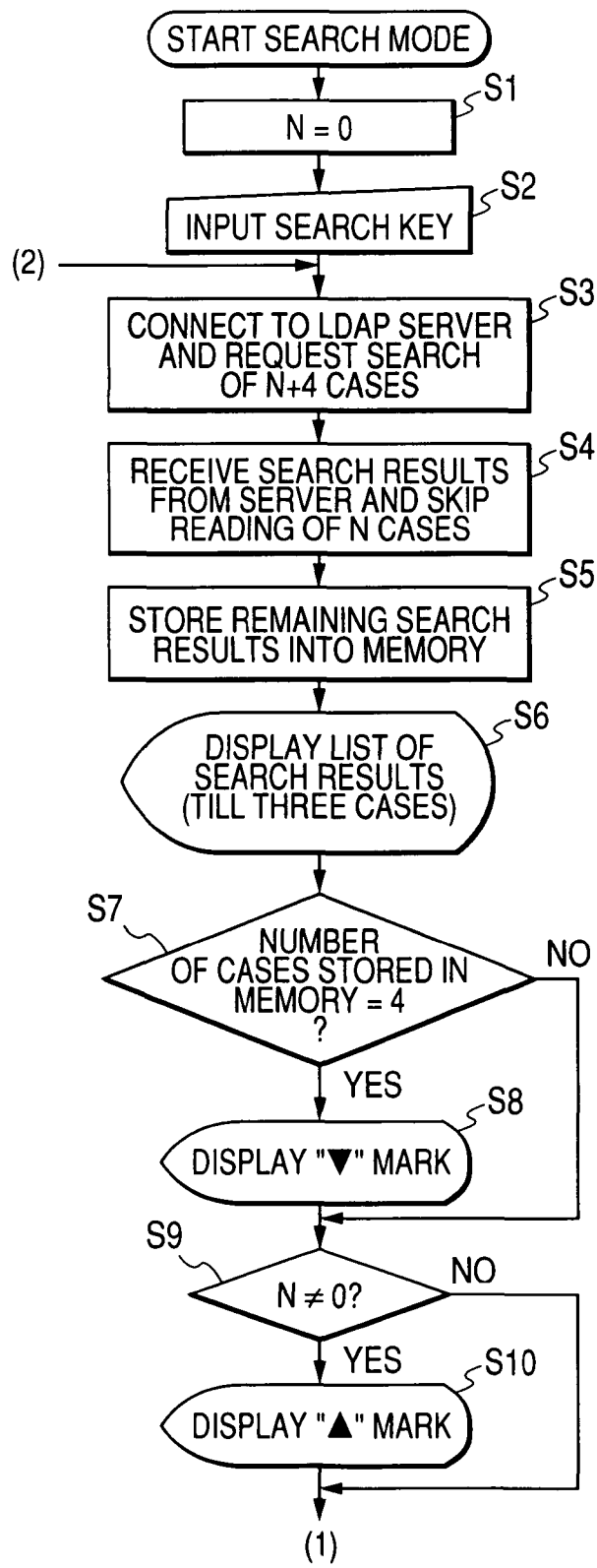
FIG. 6 is an example of a flowchart.

Next, a display example shown in FIGS. 5A to 5E will be described with reference to the flowchart of FIG. 6. FIG. 6 is a flowchart which is started when the peripheral device 10 enters the search mode. The peripheral device 10 enters the search mode when it is detected that the user makes an alphabetic input under the display state of FIG. 3A. The peripheral device 10 is equipped with a search mode key, and it enters the search mode when the search mode key is pushed by the user. A choice for a mode of directly inputting the search mode or the transmission destination information before or after the display of FIG. 3A may be displayed on the display device 19 so that the peripheral device 10 enters the search mode when the search mode is selected by input of the user. In the flowchart, N=0 is first set in step S1. The variable N is a number for indicating the storage start position of the search condition. After the processing of S1 is executed, the processing shifts to S2 to make the user input a search condition. The user inputs "NIC" as the search condition by the alphabetic input as shown in FIG. 5A, for example, and pushes the search key. At this time, the processing shifts to S3 to connect the peripheral device 10 to the LDAP server (directory serve) 30 and requests the search results of N+4. At this time, the display state of FIG. 3B appears. Since N=0 is first set in S1, the totally four search results are requested. This request is made according to the search condition transmission program 13a described above. Upon receiving this request, the directory server 30 searches information matched with the search condition from the entry information 34c, and successively returns the information as a search result.

In S4, the process of receiving the search results transmitted from the directory server 30 and skipping reading of first N search results is carried out. Then, the residual search results are stored in the storage unit 12 (S5). In this case, N=0 is set, and thus the transmitted search results are stored from the beginning without skipping any search result. Thereafter, the stored search results are displayed on the display device 19 (FIG. 5B). Search results being selected out of the displayed search results are displayed while black and white colors are inverted to each other. The user can scroll the display by pushing the lower triangular key or the upper triangular key.

When any non-displayed search result exists, the upper triangular mark 43 or the lower triangular mark 44 is displayed to inform this fact to the user. This processing is executed by the informing program 13c, and specifically these marks are displayed by executing the processing of the steps S7 to S10 of FIG. 6. In S7, it is determined whether the number of search results stored in the storage unit 12 is equal to four or not. That is, when there exists the fourth search result, which is not displayed on the display device 19, "Y" is determined and S8 is executed to display the lower triangular mark 44 on the display device. When no fourth search result exists in S7, "N" is determined and S8 is skipped. Thereafter, the processing shifts to S8 to determine whether N is not equal to zero. Here, "Y" is determined, the processing shifts to S19 to display the upper triangular mark 43 on the display device

19. That is, when another search result exists before the search result being displayed, the upper triangular mark 43 is displayed. If "N" is determined in S9, S10 is skipped, and the processing shifts to (1) of FIG. 7.

Next, FIG. 7 will be described. In S11 and S12, the user operates the upper triangular key or the lower triangular key as shown in FIG. 5B and scrolls the name being selected on the screen line by line. When the lower triangular key is operated, "Y" is determined in S11, and the processing shifts to S15. In S15, it is determined whether it is instructed to display names below the last displayed name (for example, "Nichol Miller" of FIG. 5B). Here, if "Y" is determined, the processing shifts to S16, and then returns to (2) of FIG. 6. In S16, N is added with 1, and thus N+4=5 in S3 (FIG. 6), and totally five search results are requested to the directory server 30. Then, the processing shifts to S4, and the reading of the first N search result (that is, one search result) out of the five search results transmitted from the directory server 30 is skipped, and the second to fifth search results are stored in the storage unit 12 (S5). As described above, in S4 and S5, a search condition (an (N+1)-th search condition) under which storage is started is indicated, and a search condition transmitted subsequently to the indicated search condition is stored. This processing is executed by the storage start number determining program 13b and the storage control program 13h.

In S6, the search conditions stored in the storage unit 12 are displayed, whereby the second to fourth search conditions are displayed as shown in FIG. 5C. The fifth search condition is stored in the storage unit 12, however, it is not displayed. S7 to S10 are processed in the same manner as described above, and then the processing returns to (1) of FIG. 7. When the lower triangular key is pushed under the state that the last displayed name "Nichol Walker" is selected in the display of FIG. 5C, "Y" is determined in step S15, the processing of S16 is executed, and then the processing returns to (2) of FIG. 6. In S16, the processing of N=N+1 is executed, and thus N=2 is set.

When "N" is determined in S15, the processing shifts to S12. In S12, it is determined whether the upper triangular key is pushed, and when "Y" is determined in S17, the processing shifts to S17. For example, when the upper triangular key is pushed under the state that the name "Nichol Miller" displayed at the top in the display of FIG. 5D is selected, "Y" is determined in S17 and the processing shifts to S18, and returns to (2) of FIG. 6. In S18, the processing of N=N−1 is executed, and thus the number of search results requested to the directory server 30 in S3 is reduced by one. That is, the search results are stored from the just preceding search result, and displayed. The processing of S15 and S17 is executed by the request number determining program 13i.

Figure 7:
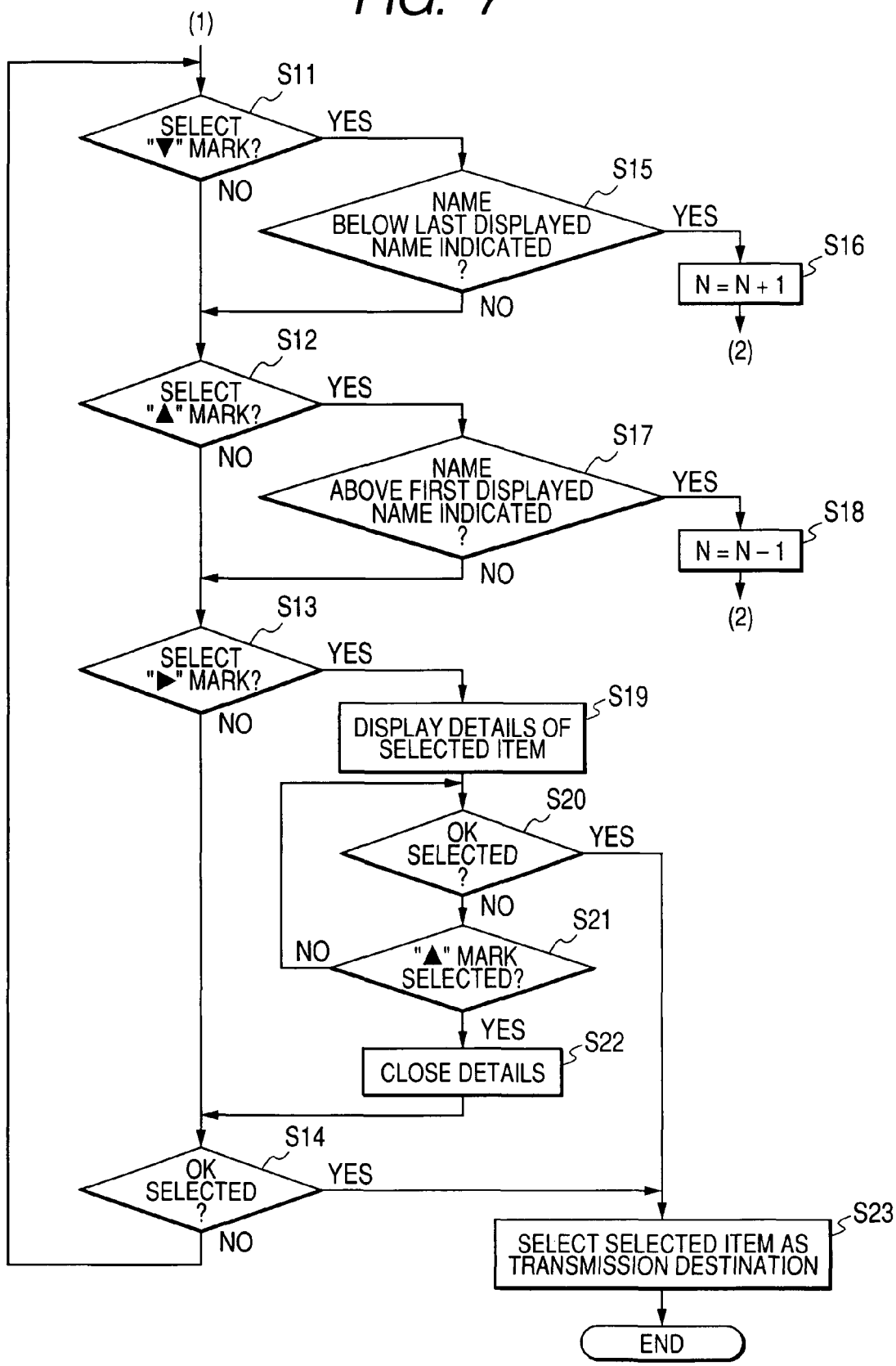
FIG. 7 is a flowchart subsequent to FIGS. 6, 11 and 12.

Furthermore, when the right triangular key is pushed in FIG. 5D, the processing shifts from S13 to S19 of FIG. 7, and the detailed information such as the FAX number or the email address of the name being selected (in this case, "Nichol Walker") is displayed. A display example is shown in FIG. 5E. When OK is selected under this state, "Y" is determined in S20, and the processing shifts to S23. In this case, the selected and displayed item (the FAX number or the email address of FIG. 5E) is selected as a transmission destination. Thereafter, FAX or email is transmitted to the selected FAX number or email address.

On the other hand, when "N" is determined in S20 of FIG. 7 (when OK is not selected), the processing shifts to S21, and it is determined whether the upper triangular key is selected or not. Here, in the case of "N", the processing returns to S20. In the case of "Y", the detail screen (FIG. 5E) is closed, and the processing returns to FIG. 5D. Thereafter, the processing shifts to S14, and it is determined whether OK is selected or not. In the case of "Y", the processing shifts to S23 to carries out FAX transmission or email transmission to the selected transmission destination. Furthermore, in the case of "N", the processing returns to S11. Even in the case of N in S13 (when the right triangular key is not selected), by selecting OK, the processing shifts from S14 to S23 to select the selected and displayed item as the transmission destination and carry out the FAX transmission or the E-mail transmission.

As described above, according to this aspect, the value of the variable N is varied in S16 or S18, and only (N+4) search conditions are requested in S3, so that it is unnecessary to transmit extra search conditions. Therefore, the transmission time can be shortened, and congestion of the network 100 can be overcome. Furthermore, reading of first N search conditions are skipped (that is, (N+1)-th search condition is indicated, and the storage of the search conditions is carried out from it). Therefore, only a necessary portion can be stored even when the storage capacity of the storage unit 12 is small.

In the above aspect, three search results (names) are displayed on the display device 19. However, four or five search results may be displayed. In the above aspect, the number of search results to be stored is set to four which is larger than the number (three) of search results to be displayed, and it is determined in step S7 of FIG. 6 whether four search results are stored or not. If four search results are stored, S8 (displaying the lower triangular mark 44) is executed. However, it is not necessarily required to store the fourth search result. For example, it may be stored at a predetermined address of the storage unit 12 only whether any non-stored search result exists in the search results transmitted from the directory server 30, and it may be determined whether S8 is executed by using this information.

Figure 9:
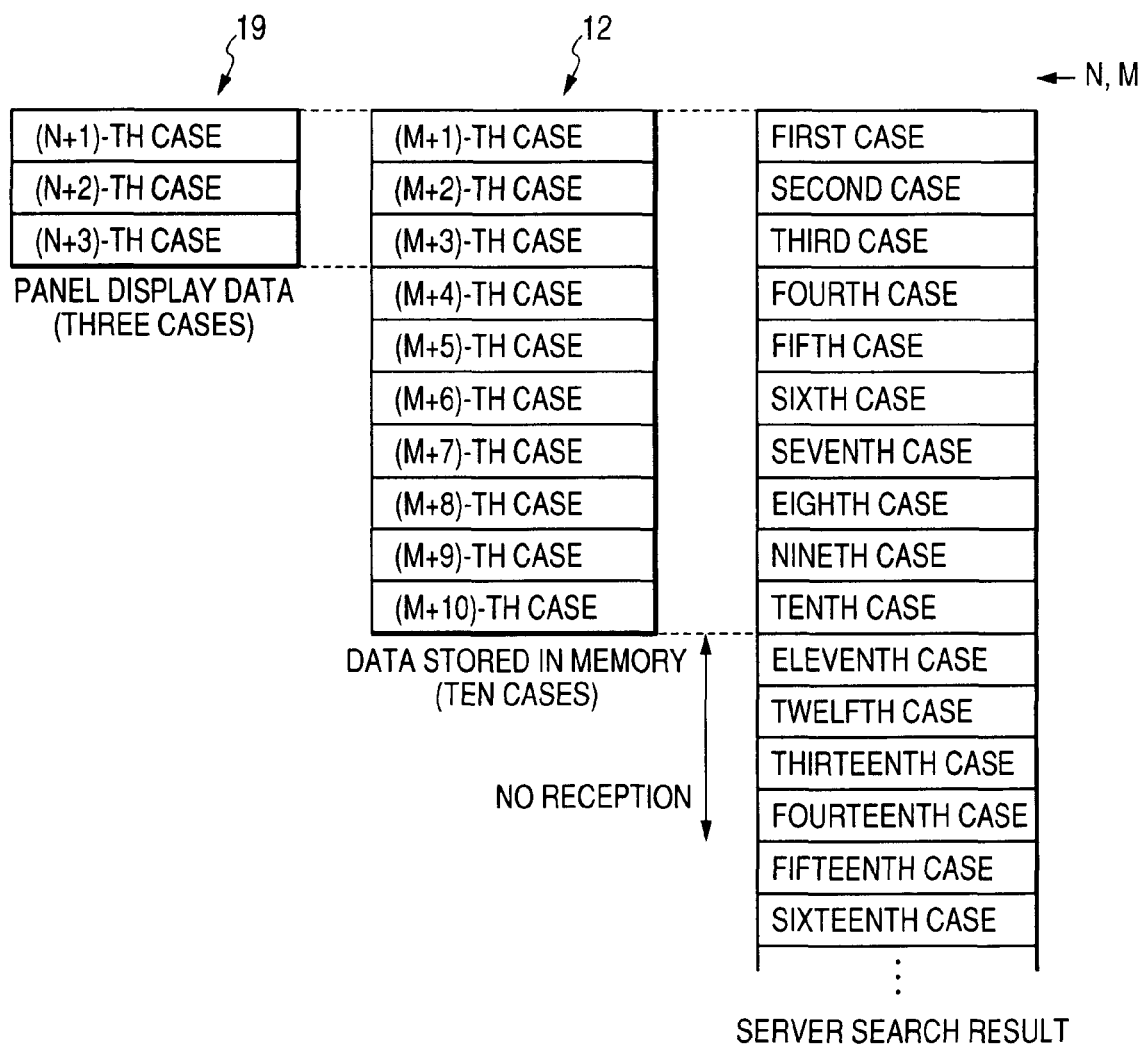
FIG. 9 is a diagram showing the relationship of search results, stored data and display data.

Next, another aspect will be described with reference to FIGS. 9 and 10. As shown in FIG. 9, the display device 19 is constructed so that three search results can be displayed on the display device 19, and the storage unit 12 is constructed so that search results whose number (ten) is larger than the number of search results which can be displayed on the display device 19 can be stored in the storage unit 12. In this case, the first to tenth search results out of the search results transmitted from the directory server 30 are stored in the storage unit 12, and the first to third search results are displayed on the display device 19. When the user pushes the lower triangular key (FIG. 5), the subsequent search results out of the storage unit 12 are displayed. As described above, if a certain large number of cases are stored in the storage unit 12 and some of them are used for display, the display speed could be increased. Furthermore, the frequency at which the search condition is transmitted to the directory server 30 is reduced, and thus the congestion of the network 100 (FIG. 1) can be overcome.

When the lower triangular key is pushed several times, there occurs necessity of displaying search results in the range which is not stored in the storage unit 12. In this case, for example, first several search results out of the transmitted search results are skipped, and then the remaining search results are re-stored. The stored search results are displayed on the display device 19. In an aspect shown in FIG. 10, fourth to thirteenth search results out of the transmitted search results are stored, and seventh to ninth search results are displayed.

Figure 10:
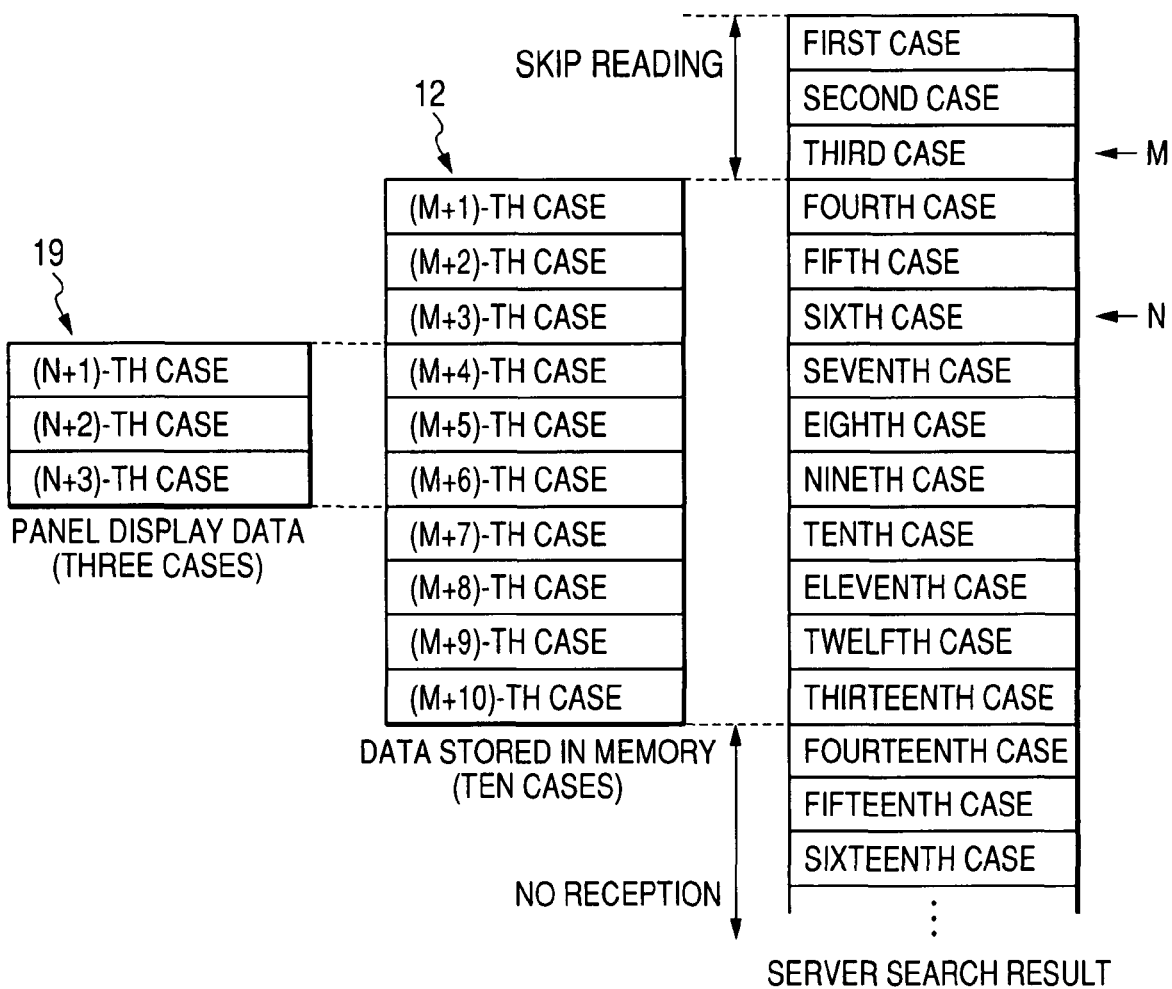
FIG. 10 is a diagram subsequent to FIG. 9.
Figure 11:
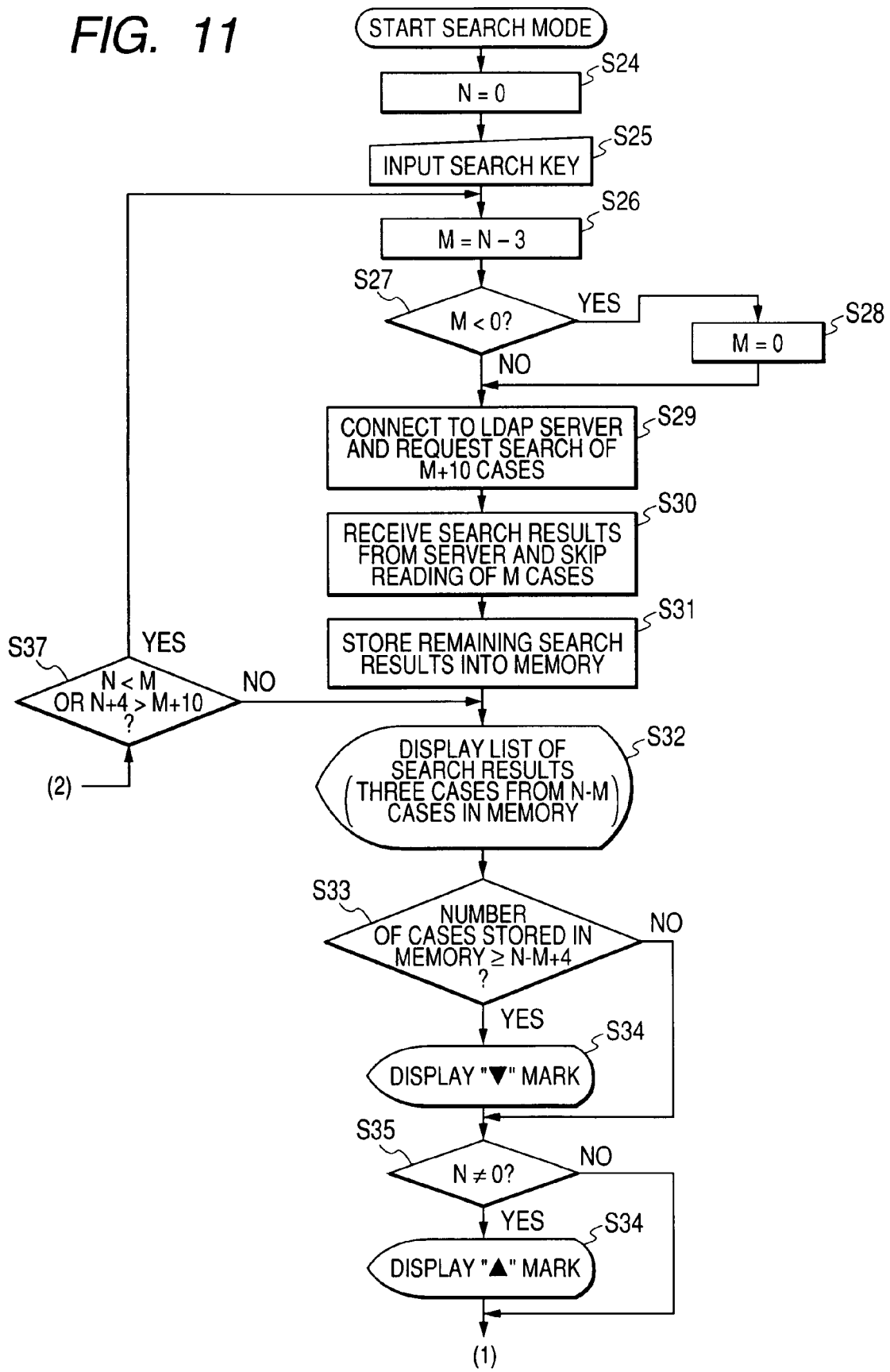
FIG. 11 is a different flowchart from FIG. 6.

FIG. 11 is a flowchart for carrying out the operation as described above. In S24, S25, N=0 is first set, and the user is made to input a search condition. Thereafter, the processing shifts to step S26, and M=N−3 is set. The variable M is a numeric value for indicating the storage start position of the search results transmitted from the directory server 30. Furthermore, the variable N is a numeric value for indicating the display start position of the search results. As shown in FIG. 10, when the display is made by using the re-stored search results, the display start position is set to (N+1) (seventh) which is subsequent to the storage start position (M+1) (fourth) by three cases. Therefore, in S26, M=N−3 is set. By setting as described above, when the user operates any one of the upper triangular key or the lower triangular key after the display, the display can be made by using the search results stored in the storage unit 12 and thus the display speed is increased.

However, at the initial stage of the flowchart, in S24, N=0 is set, and thus the relationship of the search result, the storage unit 12 and the display device 19 is as shown in FIG. 9. That is, M=0 and there is no case where M is equal to a minus value. In order to overcome this inconsistency, it is determined in S27 of FIG. 11 whether M<0, and if M<0, the processing shifts to S28 to set M to zero. Thereafter, the processing of S29 to S31 is executed. That is, in S29, the peripheral device connects to the directory server 30 to request search results of (M+10) cases (in this case, 10 cases). Then, the processing shifts to S30 to skip the search results of first M cases (in this case, 0 case). Thereafter, in S31, the remaining search results are stored in the storage unit 12.

Subsequently, the processing shifts to S32 to display the stored search results, and the processing of S33 is executed. In S33, it is determined whether the number of the cases stored in the storage unit 12≧N−M+4. That is, it is determined whether the search results subsequent to the search results being displayed are stored in the storage unit. In this case, if "Y" is determined, the lower triangular mark 44 is displayed. Furthermore, it is determined in S35 whether N is not equal to zero. That is, it is determined whether other search results exist before the search results being displayed. Here, when "Y" is determined, the processing shifts to s36, and the upper triangular mark 43 is displayed. As described above, by displaying the upper triangular mark 43 or the lower triangular mark 44, it is informed to the user that search results other than the search results being displayed exist. This processing is executed by the informing program 13c stored in ROM 13 (FIG. 2).

After S36 is executed, the processing shifts to (1) of FIG. 7. When the user pushes the lower triangular key, "Y" is determined in S11, and the processing shifts to S15. When a name below the name being displayed at the last position is indicated, "Y" is determined in S15, and the processing shifts to S16, and then the processing returns to (2) of FIG. 11. In S16, N=N+1 is set, and in S37 (FIG. 11), it is determined whether N<M or M+4>M+10 is satisfied or not. That is, in S37, it is determined whether the search results in the range stored in the storage unit 12 are displayed or not. Here, if "N" is determined (the display is made for the search results within the storage range), the processing shifts to S32, and the search results are displayed. On the other hand, if "Y" is determined in S37 (the display is made for search results out of the storage range), the processing of S26 to S31 is executed. For example, when N=6 is satisfied in S16, "Y" is determined in S37. Then, in S26, M=N−3=3 is set, and in S29, search results of M+10=13 cases are requested. Thereafter, in S30, the processing of skipping reading of the first M cases (three cases) is executed, and the residual search results (ten cases) are stored in the storage unit 12. The result is shown in FIG. 10.

As described above, the display start position N+1 comes after three cases from the storage start position M+1 (S26 and FIG. 10). Therefore, even when the user pushes any one of the upper triangular key or the lower triangular key, the search results stored in the storage unit 12 can be displayed. As a result, the display speed can be increased.

Furthermore, the variable M is indicated in S26 of FIG. 11, and in S31, a predetermined number of (ten in this aspect) search results subsequent to the variable M are stored in the storage unit 12. The processing as described above is executed by the storage start number determining program 13b and the storage control program 13h (FIG. 2).

Figure 12:
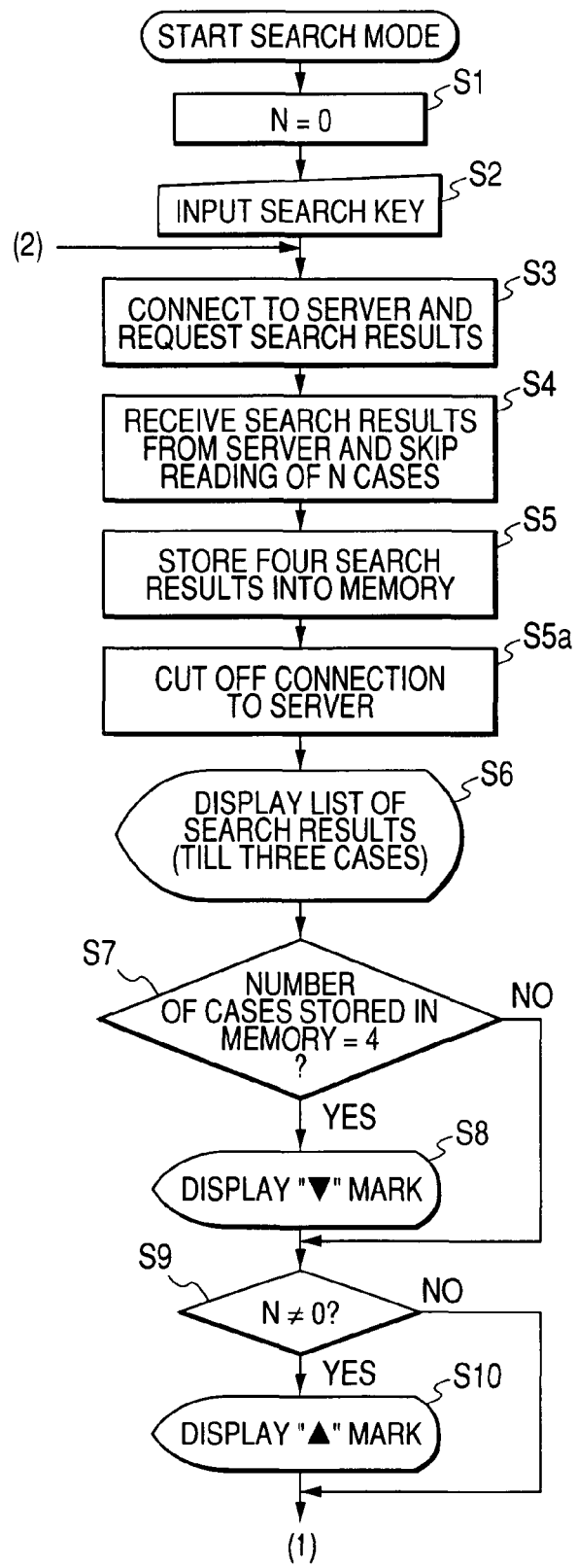
FIG. 12 is a different flowchart from FIG. 6 and FIG. 11.

Next, an aspect of FIG. 12 will be described. In this aspect, the steps S1 to S5 and S6 to S10 are the same as FIG. 6. Therefore, these steps are represented by the same reference numbers and the description thereof is omitted. After "N" is determined in S9 or after S10, the processing shifts to (1) of FIG. 7, and the processing is the same as the FIG. 6. Therefore, the description thereof is omitted. The difference from FIG. 6 resides in that S5a is added after S5. In S5a, the processing of cutting off the connection to the directory server 30 is executed at the time point when the storage unit 12 completes the storage. Accordingly, unnecessary search results are not transmitted, and the transmission time can be shortened. Furthermore, the congestion of the network 100 (FIG. 1) can be moderated.

What is claimed is:

1. A peripheral device comprising:
a communication unit configured to communicate with an LDAP server, the LDAP server including a server transmitting unit which, in response to receiving a search condition in accordance with an LDAP, transmits X matching data items matching with the search condition while assigning a number from first to X-th thereto, respectively, to a transmission source of the search condition in accordance with the LDAP, and a first storage unit which stores the X matching data items;
a second storage unit configured to store Y matching data items out of the X matching data items;
a display unit configured to display the matching data items stored in the second storage unit;
an input unit configured to receive an input operation;
a specifying unit configured to specify a search condition based on the input operation received by the input unit;
a number determining unit configured to determine a number M, which is greater than one;
a transmission control unit configured to control the communication unit to transmit the search condition specified by the specifying unit to the LDAP server in accordance with the LDAP;
a reception control unit configured to control the communication unit to receive the X matching data items in accordance with the LDAP from the LDAP server which receives the search condition transmitted by the communication unit;
a storage control unit configured to control the second storage unit to store the Y matching data items in order, starting from the M-th matching data item out of the X matching data items received by the communication unit; and
a display control unit configured to control the display unit to display the matching data items stored in the second storage unit.

2. The peripheral device according to claim 1, further comprising:
an input control unit configured to perform determination on the input operation received by the input unit in a state where the matching data items stored in the second storage unit are displayed on the display unit, wherein the display control unit is configured to control the display unit to display Z matching data items simultaneously thereon out of the Y matching data items stored in the second storage unit, and wherein when the input control unit determines that the input unit receives an update operation, the transmission control unit controls the communication unit to transmit the search condition specified by the specifying unit to the LDAP server in accordance with the LDAP, and the number determining unit determines the number M to be L+1, L being the smallest number assigned to the matching data item displayed on the display unit.

3. The peripheral device according to claim 1, further comprising:

an input control unit configured to perform determination on the input operation received by the input unit in a state where the matching data item stored in the second storage unit are displayed on the display unit, wherein the display control unit is configured to control the display unit to display Z matching data items simultaneously thereon out of the Y matching data items stored in the second storage unit, and wherein when the input control unit determines that the input unit receives an update operation, the transmission control unit controls the communication unit to transmit the search condition specified by the specifying unit to the LDAP server in accordance with the LDAP, and the number determining unit determines the number M to be M+Z.

4. The peripheral device according to claim 1, further comprising:

an input control unit configured to perform determination on the input operation received by the input unit in a state where the matching data items stored in the second storage unit are displayed on the display unit, wherein the display control unit is configured to control the display unit to display Z matching data items simultaneously thereon out of the Y matching data items stored in the second storage unit, and wherein when the input control unit determines that the input unit receives an update operation, the transmission control unit controls the communication unit to transmit the search condition specified by the specifying unit to the LDAP server in accordance with the LDAP, and the number determining unit determines the number M to be a number smaller than L by a predetermined number, L being the smallest number assigned to the matching data item displayed on the display unit.

5. The peripheral device according to claim 2,
wherein Y is greater than Z,
the peripheral device further comprising:
a first notification unit configured to cause the display unit to display a notification indicating that the matching data item assigned with a number subsequent to a number assigned to the matching data items displayed on the display unit is stored in the second storage unit when the display control unit controls the display unit to display the Z matching data items from the M-th matching data item, and when the second storage unit stores the Y matching data items.

6. The peripheral device according to claim 5,
wherein Y=Z+1 is satisfied.

7. The peripheral device according to claim 1, further comprising:
a second notification unit configured to cause the display unit to display a notification indicating that the matching data item assigned with a number smaller by one than the number assigned to the matching data items displayed on the display unit when a smallest number assigned to the matching data items displayed on the display unit is more than one.

8. The peripheral device according to claim 1, further comprising:
a communication end control unit configured to finish the communication with the LDAP server when the communication unit has received a predetermined number of matching data items.

9. The peripheral device according to claim 1,
wherein when the input unit receives an operation for displaying the matching data items in a range which is not currently displayed on the display unit, and when the second storage unit stores the matching data items in the range, the display control unit controls the display unit to display the matching data items in the range stored in the second storage unit.

10. The peripheral device according to claim 1, further comprising:
a specific information display unit configured to control the display unit to display specific information on the matching data item when the input unit receives an operation for displaying the specific information.

11. The peripheral device according to claim 1,
wherein the matching data items include entry information including transmission destination information of transmission data, and
wherein the peripheral device has a data transmission function of transmitting the transmission data to a transmission destination based on the entry information transmitted from the LDAP server.

12. A computer-readable medium having a computer program stored thereon and readable by a computer including: a communication unit configured to communicate with an LDAP server, the LDAP server including a server transmitting unit which, in response to receiving a search condition in accordance with an LDAP, transmits X matching data items matching with the search condition while assigning a number from first to X-th thereto, respectively, to a transmission source of the search condition in accordance with the LDAP, and a first storage unit which stores the X matching data items; a second storage unit configured to store Y matching data items out of the X matching data items; a display unit configured to display the matching data items stored in the second storage unit; and an input unit configured to receive an input operation, the computer program, when executed by the computer, causing the computer to perform operations comprising:

specifying a search condition based on the input operation received by the input unit;
determining a number M, which is greater than one;
controlling the communication unit to transmit the specified search condition to the LDAP server in accordance with the LDAP;
controlling the communication unit to receive the X matching data items in accordance with the LDAP from the LDAP server which receives the search condition transmitted by the communication unit;
controlling the second storage unit to store the Y matching data items in order, starting from the M-th matching data item out of the X matching data items received by the communication unit; and
controlling the display unit to display the matching data items stored in the second storage unit.

13. The computer readable-medium according to claim 12, wherein the operations further comprise:

performing determination on the input operation received by the input unit in a state where the matching data items stored in the second storage unit are displayed on the display unit;

controlling the display unit to display Z matching data items simultaneously thereon out of Y of the matching data items stored in the second storage unit; and when it is determined that the input unit receives an update operation, controlling the communication unit to transmit the search condition specified by the specifying unit to the LDAP server in accordance with the LDAP, and determining the number M to be L+1, L being the smallest number assigned to the matching data displayed on the display unit.

14. The computer-readable medium according to claim 12, wherein the operations further comprise:

performing determination on the input operation received by the input unit in a state where the matching data items stored in the second storage unit are displayed on the display unit;

controlling the display unit to display Z matching data items simultaneously thereon out of the Y matching data items stored in the second storage unit, and when it is determined that the input unit receives an update operation, controlling the communication unit to transmit the search condition specified by the specifying unit to the LDAP server in accordance with the LDAP, and determining the number M to be M+Z.

15. A method for controlling a peripheral device including: a communication unit configured to communicate with an LDAP server, the LDAP server including a server transmitting unit which, in response to receiving a search condition in accordance with an LDAP, transmits X matching data items matching with the search condition while assigning a number from first to X-th thereto, respectively, to a transmission source of the search condition in accordance with the LDAP, and a first storage unit which stores the X matching data items; a second storage unit configured to store Y matching data items out of the X matching data items; a display unit configured to display the matching data items stored in the second storage unit; and an input unit configured to receive an input operation, the method comprising:

specifying a search condition based on the input operation received by the input unit;

determining a number M, which is greater than one;

controlling the communication unit to transmit the specified search condition to the LDAP server in accordance with the LDAP;

controlling the communication unit to receive the X matching data items in accordance with the LDAP from the LDAP server which receives the search condition transmitted by the communication unit;

controlling the second storage unit to store the Y matching data items in order, starting from the M-th matching data item out of the X matching data items received by the communication unit; and controlling the display unit to display the matching data items stored in the second storage unit.

16. The method according to claim 15, further comprising:

performing determination on the input operation received by the input unit in a state where the matching data items stored in the second storage unit are displayed on the display unit, controlling the display unit to display Z matching data items simultaneously thereon out of the Y matching data items stored in the second storage unit, and when it is determined that the input unit receives an update operation, controlling the communication unit to transmit the search condition specified by the specifying unit to the LDAP server in accordance with the LDAP, and determining the number M to be L+1, L being the smallest number assigned to the matching data displayed on the display unit.

17. The method according to claim 15, further comprising:

performing determination on the input operation received by the input unit in a state where the matching data items stored in the second storage unit are displayed on the display unit;

controlling the display unit to display Z matching data items simultaneously thereon out of the Y matching data items stored in the second storage unit, and when it is determined that the input unit receives an update operation, controlling the communication unit to transmit the search condition specified by the specifying unit to the LDAP server in accordance with the LDAP, and determining the number M to be M+Z.

* * * * *